(12) United States Patent
Chaparala

(10) Patent No.: US 6,891,988 B2
(45) Date of Patent: May 10, 2005

(54) MAGNETIC POSITION DETECTION APPARATUS FOR MICRO MACHINED OPTICAL ELEMENT

(75) Inventor: Murali Chaparala, Vancouver, WA (US)

(73) Assignee: Analog Devices, Inc., Norwood, MA (US)

( * ) Notice: Subject to any disclaimer, the term of this patent is extended or adjusted under 35 U.S.C. 154(b) by 180 days.

(21) Appl. No.: 09/853,870

(22) Filed: May 11, 2001

(65) Prior Publication Data

US 2002/0167307 A1 Nov. 14, 2002

Related U.S. Application Data

(62) Division of application No. 09/851,587, filed on May 8, 2001.

(51) Int. Cl.[7] .......................... G02B 6/35; G02B 26/08; G02B 26/10
(52) U.S. Cl. .......................... 385/16; 385/18; 359/223; 359/225; 335/78
(58) Field of Search ............................. 385/12, 16, 18, 385/25; 359/223–225; 335/2, 3, 78–81

(56) References Cited

U.S. PATENT DOCUMENTS

| | | | |
|---|---|---|---|
| 5,059,783 A | 10/1991 | Stranjord | 250/227.19 |
| 5,206,983 A | 5/1993 | Guckel et al. | 29/598 |
| 5,327,033 A | 7/1994 | Guckel et al. | 310/40 |
| 5,369,361 A | 11/1994 | Wada | 324/207.2 |
| 5,477,376 A | 12/1995 | Iwatsuka | 359/283 |
| 5,617,023 A | 4/1997 | Skalski | 324/207.17 |
| 5,629,918 A * | 5/1997 | Ho et al. | 310/40 MM |
| 5,644,177 A | 7/1997 | Guckel et al. | 310/40 |
| 5,646,464 A | 7/1997 | Sickafus | 310/40 |
| 5,881,598 A | 3/1999 | Sapuppo et al. | 74/5.6 |

(Continued)

OTHER PUBLICATIONS

B. Eyre and K. S. J. Pister, Micromechanical Resonant Magnetic Sensor in Standard CMOS, Transducers 97, 1997 Int. Conf. Solid–State Sensors and Actuators, Chicago, Jun. 16–19, 1997.*

(Continued)

*Primary Examiner*—Akm Enayet Ullah
*Assistant Examiner*—Omar Rojas
(74) *Attorney, Agent, or Firm*—J D I Patent; Joshua D Isenberg

(57) ABSTRACT

An apparatus having magnetic detection sensor deployed on a micro machined optical element is exposed to a magnetic field to sense change in property as the micro machined optical element is manipulated with respect to the magnetic field, and, conversely when the magnetic field is manipulated with respect to the micro machined optical element. The electrical, optical and/or mechanical change in sensor property varies according to said manipulation, and telemetry created by said property change tracks the manipulation of the moveable portion of the optical element. The system includes a configuration capable of compensating for temperature variation.

8 Claims, 11 Drawing Sheets

U.S. PATENT DOCUMENTS

| | | | |
|---|---|---|---|
| 5,929,542 A | | 7/1999 | Ohnstein et al. ............... 310/40 |
| 5,945,898 A | | 8/1999 | Judy et al. .................... 335/78 |
| 5,966,066 A | | 10/1999 | Mehgrany et al. ............ 337/70 |
| 6,188,504 B1 | * | 2/2001 | Murakami et al. ........... 359/224 |
| 6,198,856 B1 | | 3/2001 | Schroeder et al. ............. 385/16 |
| 6,215,318 B1 | * | 4/2001 | Schoefthaler et al. ........ 324/658 |
| 6,246,565 B1 | | 6/2001 | Belfatto et al. ........... 361/168.1 |
| 6,252,395 B1 | | 6/2001 | Aoyama et al. ........ 324/207.12 |
| 6,259,835 B1 | | 7/2001 | Jing ............................. 358/18 |
| 6,356,741 B1 | * | 3/2002 | Bilotti et al. .................. 455/90 |
| 6,366,186 B1 | | 4/2002 | Hill et al. ...................... 335/78 |
| 6,388,789 B1 | * | 5/2002 | Bernstein .................... 359/198 |
| 6,404,942 B1 | | 6/2002 | Edwards et al. .............. 385/18 |
| 6,528,887 B2 | * | 3/2003 | Daneman et al. ............ 257/774 |
| 6,633,693 B1 | * | 10/2003 | Peale et al. .................... 385/18 |
| 6,714,336 B2 | * | 3/2004 | Orcutt et al. ................ 359/225 |
| 6,794,965 B2 | * | 9/2004 | Shen et al. .................... 335/78 |
| 6,801,681 B2 | * | 10/2004 | Feierabend et al. ........... 385/18 |
| 6,819,820 B1 | * | 11/2004 | Chaparala et al. ............. 385/17 |
| 2002/0167309 A1 | | 11/2002 | Chaparala .............. 324/207.21 |
| 2002/0168130 A1 | | 11/2002 | Chaparala .................... 385/16 |
| 2002/0171420 A1 | | 11/2002 | Chaparala et al. .......... 324/225 |
| 2003/0117027 A1 | * | 6/2003 | Rybnicek et al. ............. 310/28 |

OTHER PUBLICATIONS

Eyre et al. MEMS Magnetic Sensor in Standard CMOS, Science Closure and Enabling Technologies for Constellation Class [online], [retrieved on Mar. 17, 2003]. Retrieved from the Internet <URL: http://sprg.ssl.berkeley.edu/ConstellationClassMissions/eyre.pdf>.*

Miller R. et al., A Magnetically Actuated MEMS Scanning Mirror, International Society for Optical Engineering, vol. 2687 (Mar. 1996), pp. 47–52.*

Office Action in related application 09/853,869, dated Oct. 8, 2002.

Office Action in related application 09/853,869, dated May 22, 2002.

Office Action in related application 09/853,868, dated Jul. 2, 2002.

Office Action in related application 09/851,587, dated Sep. 11, 2002.

Office Action in related application 09/851,587, dated Dec. 4, 2003.

* cited by examiner

US 6,891,988 B2

MAGNETIC POSITION DETECTION APPARATUS FOR MICRO MACHINED OPTICAL ELEMENT

CROSS REFERENCE TO RELATED APPLICATION

This application is a division of and claims priority from U.S. patent application Ser. No. 09/851,587, by Murali Chaparala entitled "MAGNETIC POSITION DETECTION FOR MICRO MACHINED OPTICAL ELEMENTS," filed May 8, 2001, and which is incorporated herein by reference.

FIELD OF THE INVENTION

This invention relates to optical communications and more particularly to measuring the position of micro machined optical elements.

BACKGROUND OF THE INVENTION

MEMS free-space optical switches can be categorized into two major branches: the planar matrix (2-dimensional) approach, and the beam-steering (3-dimensional) approach. The 2D approach typically involves mirrors that move between on and off position, while the 3-D approach typically involves mirrors that tilt over a continuous range of angles to deflect optical signals from one fiber array to another. The 3-D approach relies on accurate control of mirror position to minimize optical loss from the coupling of photons from one fiber to another.

Fiber optic communications systems are subject to faults that interrupt signal traffic. The fault may occur in the optical switch or in some other part of the system. In both switching approaches it is useful for, fault detection purposes, to know whether a given mirror actuating mechanism has failed. One way to determine this is to sense the position of the mirror to determine whether it is in a desired state. If the mirror is not in the desired state, a fault in the mirror mechanism may be determined and signal traffic may be routed around the faulty mirror.

Most of these MEMS optical elements have used some variation of sensing capacitance or piezoresistance as a means of detecting the angular position of the optical element. In the 2D approach, to perform accurate capacitance sensing the signal lines have to be shielded which adds significantly to the complexity of the MEMs die. Second, the capacitive sensing is highly non linear and the sensitivity degrades significantly at large angular deviations from the ideal final position. The piezoresistive sensors have smaller signal gain making them susceptible to noise and cross-talk.

Thus, there is a need in the art, for a new method and apparatus for sensing the angular position of a MEMS optical element and an optical switch incorporating same.

SUMMARY OF THE INVENTION

The disadvantages associated with the prior art are overcome by the present invention of a method and apparatus for measuring the position of a micro machined optical element.

According to an embodiment of the invention, an apparatus includes a micro machined optical element and at least one magnetic sensor disposed on the movable portion of the micro machined optical element. The sense field may be generated by the actuation field used to manipulate the movable portion, or by a magnetic structure disposed on the fixed portion of the micro machined optical element. Alternatively, a sense field generating magnetic structures may be disposed on a moveable portion of the micro machined optical element and a magnetic sensor may be positioned on a nearby non-moveable portion of the micro machined optical element.

Magnetic sensors, such as magnetoresistive elements, magnetostrictive elements, Hall-effect devices and sense coils provide for sensitive, reliable and robust measurement of the position or switching state of MEMS devices such as those used in optical switches.

DETAILED DESCRIPTION

Figure 1:
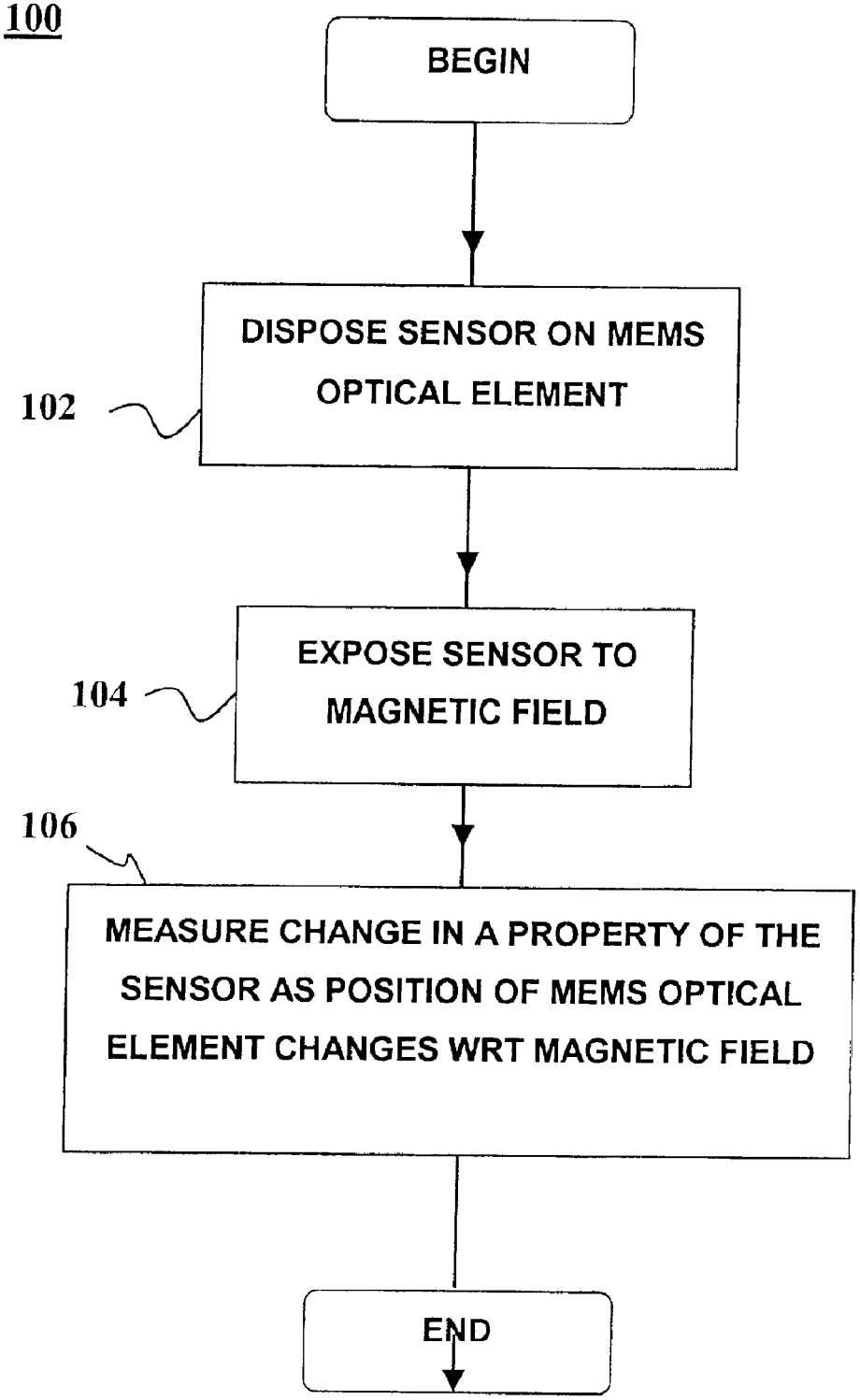
FIG. 1 is a flow diagram of a method for measuring the position of a micro machined optical element according to a first embodiment of the present invention FIG. 2A an isometric schematic diagram of an apparatus according to a second embodiment of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Theory

Magnetic sensors may detect changes in a magnetic field by sensing a change in an electrical, mechanical and/or optical property of the sensor that result from changes in the magnetic field. The change in the electrical, mechanical and/or optical property may depend upon the strength of the magnetic field or the relative position of the field with respect to the sensor. Magnetic sensors include, but are not limited to magnetoresistive sensors, magnetostrictive sensors, Hall-effect sensors, flux sensing coils, magnetostriction sensors and magneto optic sensors.

Magnetoresistive sensors utilize materials having an electrical resistance that changes in response to a change in a magnetic field. Magnetoresistivity in ferromagnetic materials was discovered in 1856 by Lord Kelvin, and has since been used in a variety of magnetic sensors to detect magnetic field strength and direction. The change in resistivity is dependent upon the strength of the magnetic field and the relative orientation of the field with respect to a conduction path through the magnetoresistive material. The change is usually a minimum when the field is perpendicular to the conduction path and is usually a maximum when the field is parallel to the conduction path. As the conduction path of a magnetoresistive sensor changes with respect to an external magnetic field (or vice-versa) the electrical resistance changes.

The Hall effect is based on the deflection of moving electric charges by a magnetic field. In a Hall effect sensor, the electrical property may be a voltage, sometimes referred to as a Hall voltage. The Hall voltage is related to the strength of an electric field, referred to herein as the Hall electric field, that results from the interaction of an electric current with a magnetic field. The Hall electric field is generally directed perpendicular to both the magnetic field and the direction of flow of the electric current through the Hall effect sensor. As the direction of flow of the electric current through the Hall effect sensor changes with respect to an external magnetic field (or vice-versa) the Hall voltage changes.

Flux sensing coils operate on the principle of electromagnetic induction. As the AC magnetic flux through the coil changes a voltage may be induced on the coil. The magnetic flux may change due to a change in intensity of an external magnetic field. Alternatively, the flux may change due to a change in the relative position of the coil with respect to the magnetic field. Flux sensing coils may be characterized by a property known as electrical inductance, which relates the voltage across the coil to the rate of change of electric current through the coil. The inductance of a coil may change, e.g., due to a change in proximity of magnetic material with respect to the coil.

The term magnetostriction refers to the change in the physical dimensions caused by magnetization. Magnetostriction sensors utilize this effect to measure field strength. Magneto optic sensors utilize materials characterized by optical properties that depend on strength and/or orientation of an applied magnetic field. Such optical properties include, but are not limited to, polarizing direction, reflectivity etc. For example, in a Kerr or Faraday rotation, the polarization of optical signals is rotated by an amount that depends on the surface magnetization, which in turn depends on the strength and direction of the applied magnetic field. Thus, the amount of polarization rotation may be used as an indicator of magnetic field strength and/or orientation.

Magnetic Sensors to Sense MEMS Position

According to an embodiment of the invention, a magnetic sense method includes disposing a magnetic sensor on the micro machined optical element, exposing the magnetic sensor to a magnetic field, and measuring a change in an electromagnetic, mechanical and/or optical property of the magnetic sensor as the position of the micro machined optical element changes. The micro machined optical element may comprise of a movable and fixed element made from single, composite, or multiple dies.

FIG. 1 depicts a flow diagram illustrating an example of a method 100 for measuring the position of a micro machined (MEMS) optical element according to a first embodiment of the invention. At step 102 a magnetic sensor is disposed on a micro machined optical element. At step 104 the magnetic sensor is exposed to a magnetic field. At step 106 a change in an electrical, mechanical and/or optical property of the magnetic sensor is measured as an orientation of the MEMS optical element changes with respect to the magnetic field. As used herein, "position" may refer to relative spatial position, relative angular orientation, or some combination of both. Furthermore, the position of the MEMS optical element may change with respect to the magnetic field if the magnitude or direction of the magnetic field changes with respect to the MEMS optical element. The ON/OFF state of a 2D MEMS optical switch may be determined by comparing the value of the magnetic sensor property measured in step 106 with one or more predetermined values of the sensor property when the MEMS optical element is known to be in an ON and/or OFF position.

Figure 2A:
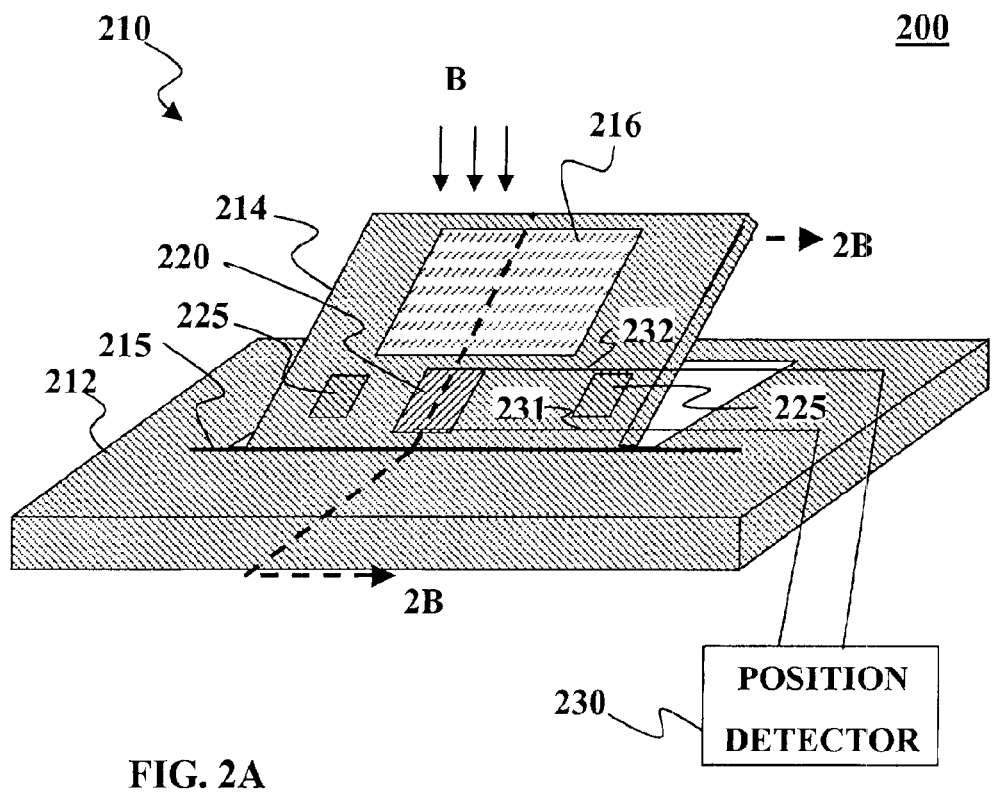
FIG. 2B is a cross-sectional schematic diagram taken along line 2B—2B of FIG. 2A.
Figure 2B:
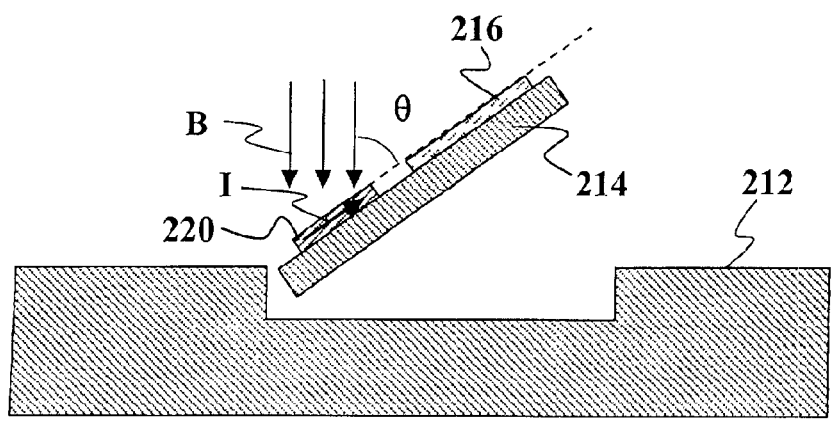

FIGS. 2A–2B depicts schematic diagrams of an apparatus 200 according to a second embodiment of the invention. The apparatus 200 includes a micro machined optical element 210 and a magnetic sensor 220 disposed on the micro machined optical element 210. The magnetic sensor 220 may be coupled to a position detector 230, e.g. by leads 231, 232.

By way of example, the micro machined optical element 210 may include a fixed portion, such as a base 212, and a movable portion, such as a flap 214. As used herein, the term "moveable" means capable of movement by translation or rotation or some combination of both. Translation includes translation with respect to one or more axes. Rotation includes rotation with respect to one or more axes. By way of example, the flap 214 may rotate about an axis 215. The axis 215 may be oriented substantially parallel to a plane of the flap 214. Alternatively, the axis 215 may be substantially perpendicular to the plane of the flap such that the flap is oriented substantially perpendicular to a plane of the base 212. The flap 214 may be coupled to the base e.g. by one or more flexures, so that the flap 214 is movable out of the plane of the base 212. The flexures may apply a torsional, or restoring force that returns the flap 214 to a rest position when an actuating force is removed. Other restoring forces may be applied to flap 214 to return the flap to the rest position. Such forces may be exerted on flap 214 by biasing mechanisms that operate via pneumatic, thermal, or magnetic principals, including coils that interact with an external magnetic field, electrostatic elements, such as gap closing electrodes, piezoelectric actuators and thermal actuators. Multiple restoring forces may also be used together, and the forces may operate along the same or opposing directions.

A light-deflecting element 216 may be disposed on the flap 214 to deflect one or more optical signals. By way of example, the light-deflecting element 216 may be a simple plane reflecting (or partially reflecting) surface, curved reflecting (or partially reflecting) surface, prismatic reflector, refractive element, prism, lens, diffractive element, e.g. fresnel lens, a dichroic coated surface for wavelength specific and bandpass selectivity, or some combination of these.

Any conventional means may be used to provide an actuating force to move the flap 214. For example, the flap 214 may contain a magnetically active element 225 to facilitate movement of the flap by interaction with an externally applied magnetic field. The magnetically active element may be a magnetically active material having, e.g. a fixed magnetic moment, i.e., it may be a permanent magnet. Magnetically active materials may include Nickel, Nickel-Iron, Iron-Cobalt, Aluminum-Nickel-Cobalt, Neodymium-Iron-Boron, etc., and, may be deposited in a uniform or stepped pattern. Alternatively, e.g. one or more vertical combdrive actuators may be used to tilt the flap 214 through a continuous range of angles in a controlled fashion.

The magnetic sensor 220 may be used to sense the state or position of a flap such as the flap 214. The magnetic sensor 220 may operate by sensing a change in an electrical property such as a resistance, reactance, or impedance of the sensor under the influence of a magnetic field B. The magnetic field B may be an external field that actuates movement of the flap by interaction with a magnetic material 225 on the flap 214. Alternatively, the magnetic field may be a separate sense magnetic field, e.g. a magnetic field that is produced by the magnetic material 225. The magnetic sensor 220 may include, but is not limited to, magnetoresistive sensors including giant magnetoresistance (GMR) sensors, such as spin valves, colossal magnetoresistance (CMR) sensors, anisotropic magnetoresistance (AMR) sensors, magnetic tunnel junction (MTJ) devices, and Hall effect sensors, flux sensing coils, magnetostriction sensors and magneto optic sensors.

By way of example and without loss of generality, the magnetic sensor 220 may be a magnetoresistive sensor that includes a magnetoresistive material. Examples of magnetoresistive materials Include Cu, Ni, Fe, Co and their alloys, oxides and structures having multiple layers containing one or more of these. A magnetic sensor 220 in the form of a magneto resistive sensor may be formed by depositing magnetoresistive material and leads on the micro machined optical element 210. Evaporation and annealing processes may be used for a multiple layer or GMR film. The magnetoresistive material may be deposited by suitable techniques including, but not limited to, sputter deposition, evaporation and electroplating FIG. 2B shows a cross-sectional schematic diagram of the apparatus 200 taken along line 2B—2B. The flap 214 may make an angle θ with respect to the magnetic field B. A sense current I flows through the MR sensor 220. The MR sensor 220 may have a thickness that is very small compared to its length and width to constrain the sense current I to flow in a path substantially within a plane. The sense current I is directed at an angle θ with respect to the magnetic field B. The sensor may be disposed on the flap 214 as shown in FIG. 2B, so that the angle θ changes as the flap 214 rotates with respect to the magnetic field B. Since the electrical property of the MR sensor 220 depends on both B and θ, changes in the angular orientation of the flap produce corresponding changes in the electrical property of the MR sensor 220. Alternatively, the flap 214 may translate with respect to the magnetic field B. If the magnetic field B is non-uniform in either magnitude or direction, changes in the spatial position of the flap 214 may produce changes in the electrical property of the magnetic sensor 220.

The position detector 230 may measure changes in the electrical property of the magnetic sensor 220 that varies with changes in a magnetic flux through the magnetic sensor 220. Where, for example, the relevant electrical property of the magnetic sensor is an electrical resistance, the position detector 230 may include a resistance measuring circuit. Such a circuit may supply a fixed sense current I to the magnetic sensor 220 and measure changes in the voltage across the magnetic sensor 220. If the relevant electrical property of the MR sensor 220 is a Hall voltage, the position detector may supply a fixed current to the opposite ends of the magnetic sensor 220 and detect the Hall voltage that develops across the width of the detector. The position detector 230 may be implemented in hardware, software, firmware, or some combination of these. By way of example, the position detector 230 may be implemented as one or more application specific integrated circuits (ASIC's).

Figure 3A:
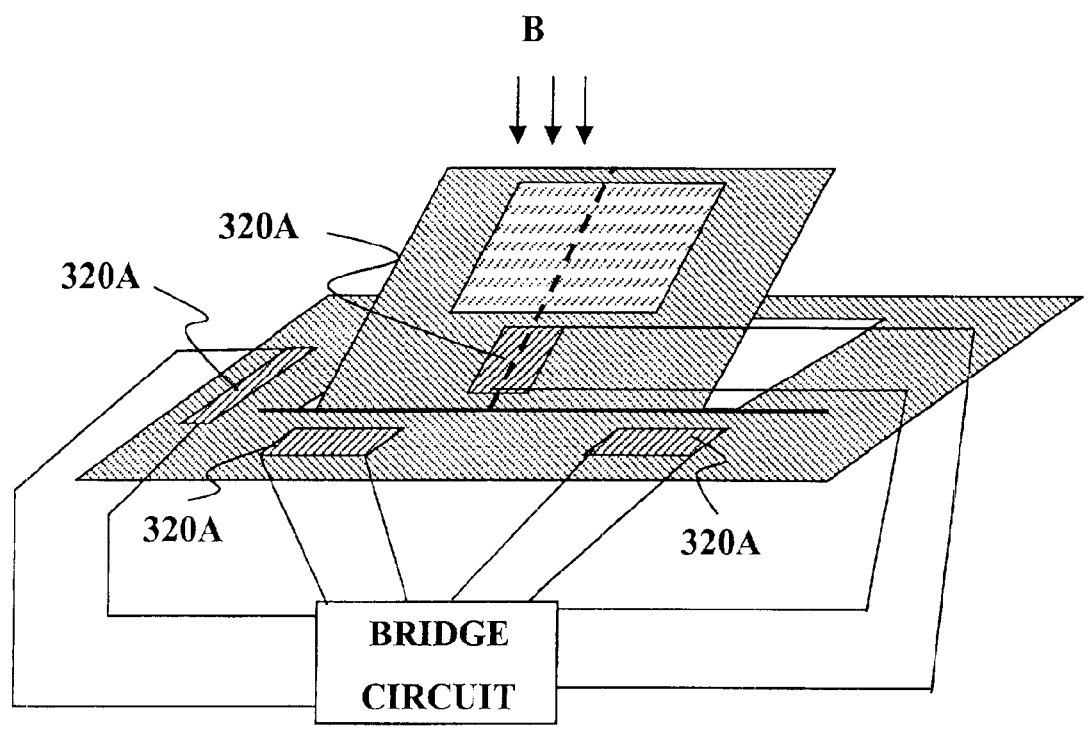
FIG. 3A is an isometric schematic diagram of an apparatus according to an alternative version of the second embodiment of the invention.

More than one magnetic sensor may be disposed on the micro machined optical element. Furthermore, the magnetic sensor may be disposed on the fixed portion of the micro machined optical element. By way of example, FIG. 3 depicts an isometric schematic diagram of an apparatus 300 according to an alternative version of the second embodiment of the invention. Apparatus 300 may include a micro machined optical element 310 and first, second, third, and fourth magnetic sensors 320A, 320B, 320C, 320D disposed on the micro machined optical element 310. The magnetic sensor 320 may be coupled to a bridge circuit 330. The optical element 310 may include a fixed portion 312 and a moveable portion 314. The magnetic sensors 320A, 320B, 320C, 320D may include, but are not limited to, giant magnetoresistance (GMR) sensors, spin valves, colossal magnetoresistance (CMR) sensors, anisotropic magnetoresistance (AMR) sensors, magnetic tunnel junction (MTJ) devices, and Hall effect sensors, flux sensor coils, magnetostriction sensors and magneto optic sensors.

By way of example, the magnetic sensors 320A, 320B, 320C, 320D may be magnetoresistive (MR) sensors. The magnetoresistive sensors may be formed from a pattern of magnetoresistive material laid out on the micro machined optical element 310, e.g., by photolithographic techniques. As the position of the movable portion 314 changes with respect to the magnetic field B during the actuation cycle, the orientation of the sensor 320A with respect to the magnetic field B also changes, e.g., from a from parallel to a perpendicular orientation. In the version of the second embodiment depicted in FIG. 3A the first MR sensor 320A may be disposed on the movable portion 314 of the micro machined element 310 and the other three sensors 320B, 320C, 320D disposed on the fixed portion 312. As the angular orientation of the movable portion 314 changes with respect to a magnetic field B an electrical property of the first sensor 320A on the movable portion 314 changes correspondingly as described above. The electrical properties of the other three sensors 320B, 320C, 320D, however, remain substantially fixed as the angular orientation of the movable portion changes with respect to the magnetic field B. The properties of all four sensors 320A, 320B, 320C, 320D change in proportion to changes in the magnetic field B. Thus, if all four sensors 320A, 320B, 320C, 320D are appropriately coupled to the bridge circuit 330 an output of the bridge circuit may be made sensitive to changes in the angular orientation of the movable portion 314 of the micro machined optical element 310, but substantially insensitive to changes in the magnetic field B.

Figure 3B:
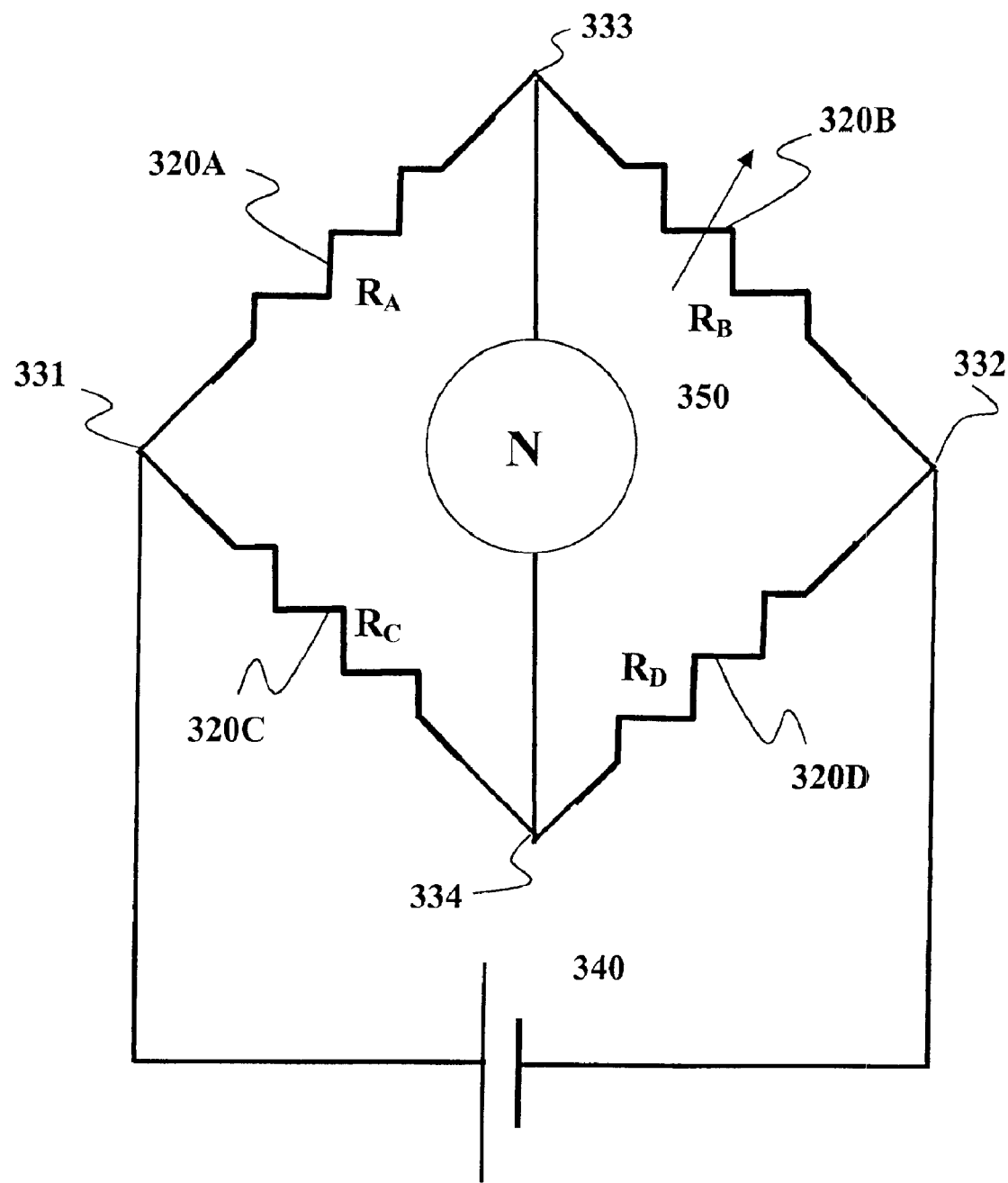
FIG. 3B is a schematic diagram of a Wheatstone bridge circuit that may be used with the apparatus of FIG. 3A.

FIG. 3B illustrates a schematic diagram of an example of a bridge circuit 330' that may be in conjunction with the apparatus 300. Although the following relates to the use of a bridge circuit with magnetoresistive sensors, bridge circuits may also be used with other magnetic sensors such as Hall effect sensors, flux sensing coils, magnetostriction sensors and magneto optic sensors. The four magnetoresistive sensors 320A, 320B, 320C, 320D may be connected in a Wheatstone bridge fashion with one sensor 320A being disposed on the movable portion 314 of the micro machined optical element 310.

By way of example, each of the four magnetoresistive sensors 320A, 320B, 320C, 320D may be respectively characterized by an electrical resistance $R_A$, $R_B$, $R_C$, $R_D$ that changes in response to changes in the magnetic field B. The first and third magnetoresistive sensors 320A, 320C may be electrically coupled at a first junction 331. The second and fourth magnetoresistive sensors 320B, 320D may be electrically coupled at a second junction 332. The first and second magnetoresistive sensors 320A, 320B may be electrically coupled at a third junction 333. The third and fourth magnetoresistive sensors 320C, 320D may be electrically coupled at a fourth junction 334. A current source 340 may be coupled between the first and second junctions 331, 332, and null detector (N) 350 may be electrically coupled between the third and fourth junctions 333, 335. The null detector 350 may be regarded as a sensitive electric current detector. By way of example, the resistance of the circuit between the second and third junctions, e.g., $R_B$, may be varied to change the current through the null detector 350. When the current through the null detector 350 is zero, it can be shown that the resistance of the magnetoresistive sensor 320A may be given by:

$$R_A = \frac{R_C R_B}{R_D}$$

Since $R_A$, $R_C$, $R_C$, $R_D$, are dependent magnetic field B changes in the magnetic field B tend to cancel out. However, in this example, only $R_A$ depends on the angle θ. Thus, the bridge circuit 330' may capture information regarding the angular position of the movable portion 314 of the micro machined optical element 310. Although the foregoing discussion describes measurement of electrical resistance, Wheatstone bridge circuits may be utilized to measure other electrical properties such as Hall voltages. Other bridge circuits, such as Mueller bridge circuits may be used with the apparatus 300 to measure the resistance or other electrical property of one or more magnetic sensors. Furthermore, a single magnetic sensor may be coupled to a bridge circuit to sense a change in resistance or other relevant electrical property. One or more magnetic sensors can be employed as sense elements in a feedback loop to control the mirror angle, and to incorporate a diagnostic routine to inform a user of switch level malfunctions in the event that the control loop fails to move the mirror to the desired position.

Figure 4:
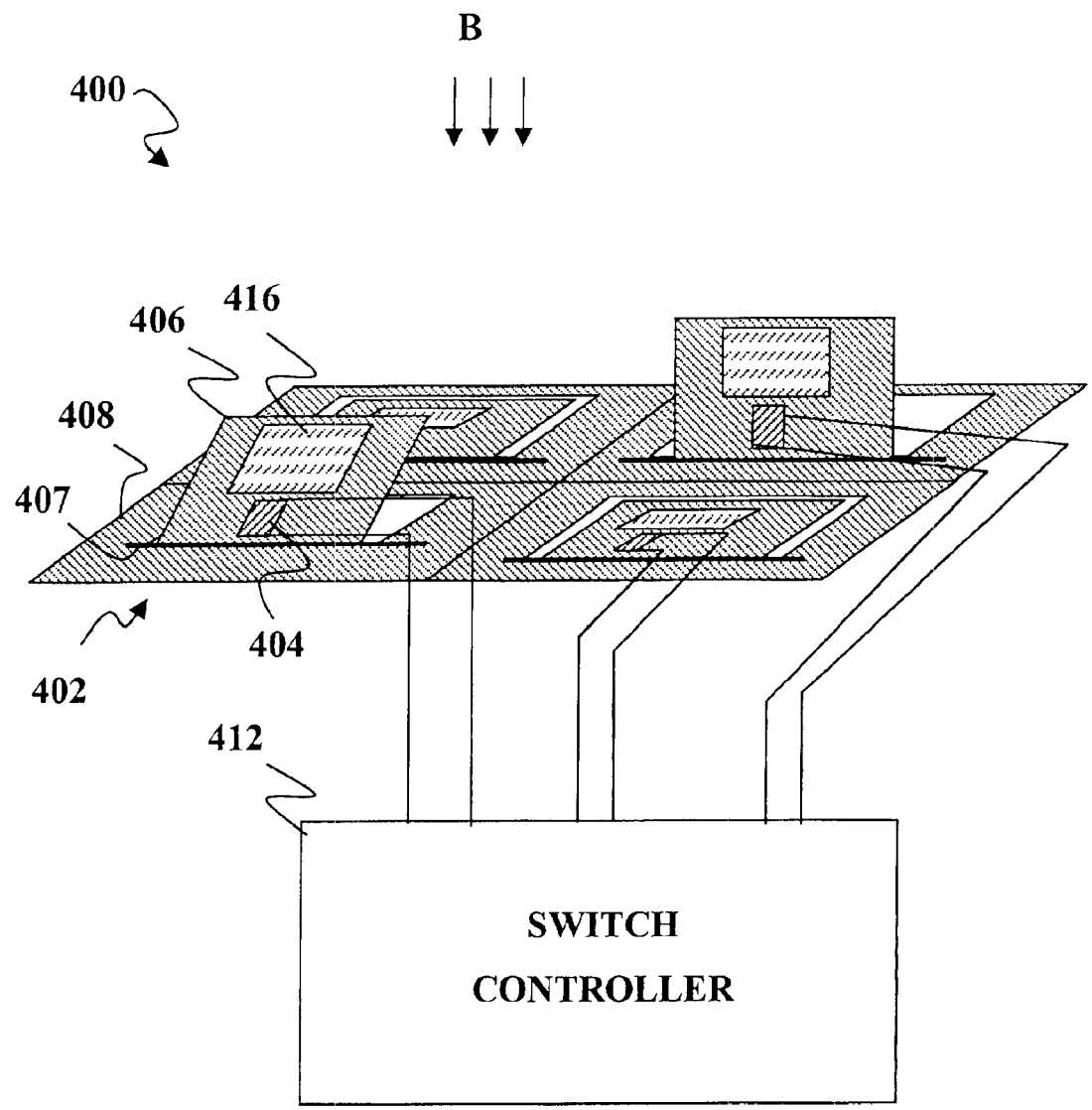
FIG. 4 is an isometric schematic diagram of a MEMS optical switch according to a third embodiment of the invention.

Embodiments of the present invention can be used to measure the angular position of the scanning MEMS micro mirrors used in fiber-optic switches for optical communication systems. According to one embodiment of the invention, an optical switch includes a plurality of micro machined optical elements and at least one magnetic sensor or magnetic sense field generator disposed on one or more of the movable micro machined optical elements and non-movable elements in the plurality. FIG. 4 depicts an isometric schematic diagram of an example of a MEMS optical switch 400. According to a third embodiment of the invention, switch 400 may generally includes a plurality of micro machined optical elements 402 and magnetic sensors 404. The magnetic sensors 404 may include, but are not limited to the various types of sensors described above, such as giant magnetoresistance sensors, colossal magnetoresistance sensors, anisotropic magnetoresistance sensors, magnetic tunnel junction devices, Hall effect sensors, flux sensing coils, , magnetostriction sensors, magneto optic sensors and the like. Each micro machined optical element 402 may include a movable portion 406. The sensors 404 may be disposed on the movable portions 406 as described above. By way of example, the movable portion may rotate about an axis 407 relative to a fixed portion 408. The fixed portion 408 may be a base common to all of the micro machined optical elements 402.

The movable portions 406 may include a light deflecting elements 416. By way of example, the light-deflecting element 416 may be a simple plane reflecting (or partially reflecting) surface, curved reflecting (or partially reflecting) surface, prismatic reflector, refractive element, prism, lens, diffractive element, e.g. fresnel lens, a dichroic coated surface for wavelength specific and bandpass selectivity, or some combination of these. The light deflecting elements 416 may deflect optical signals to selectively couple the signals from one optical fiber to another. It must be stated that movable portion 406 is shown for example purposes only, that a plurality of movable element designs exist, and the present invention may be used on various MEMS optical mirror designs that utilize a movable optical element. The sensors 404 may be coupled to a switch controller 412. The switch controller 412 may be implemented in hardware, software, firmware, or some combination of these. By way of example, the switch controller 412, may be implemented as one or more application specific integrated circuits (ASIC's). The switch controller 412 may receive information on the angular position of the movable portions of the micro machined optical elements 402 from the sensors 404. The switch controller may include a feedback loop to control the angle of the movable portions. Alternatively, the switch controller 412 may incorporate a diagnostic routine to inform a user of switch level malfunctions in the event that the control loop fails to move the micro machined optical element 402 to a desired position.

In some versions of the second embodiment of the invention, the magnetic sensor may be placed on a fixed portion of a micro machined optical element. FIGS. 5A–5E depict several alternative versions of this embodiment. In these versions, a magnetic structure characterized by a permanent magnetic moment is disposed on a moveable portion and the magnetic sensor and its associated leads are disposed on a nearby fixed portion. The magnetic structure may produce a magnetic flux that passes through a magnetoresistive sensor, Hall effect sensor or coil wherein the flux changes as the position of the magnetic material changes with respect to the sensor. Changes in flux through the sensor may cause changes an electrical property of the sensor, e.g. electrical resistance, Hall voltage or inductance. An advantage of this configuration is that an electrical connection to the moveable portion is not required. This greatly simplifies the manufacture of the apparatus and improves the robustness of its operation.

Figure 5A:
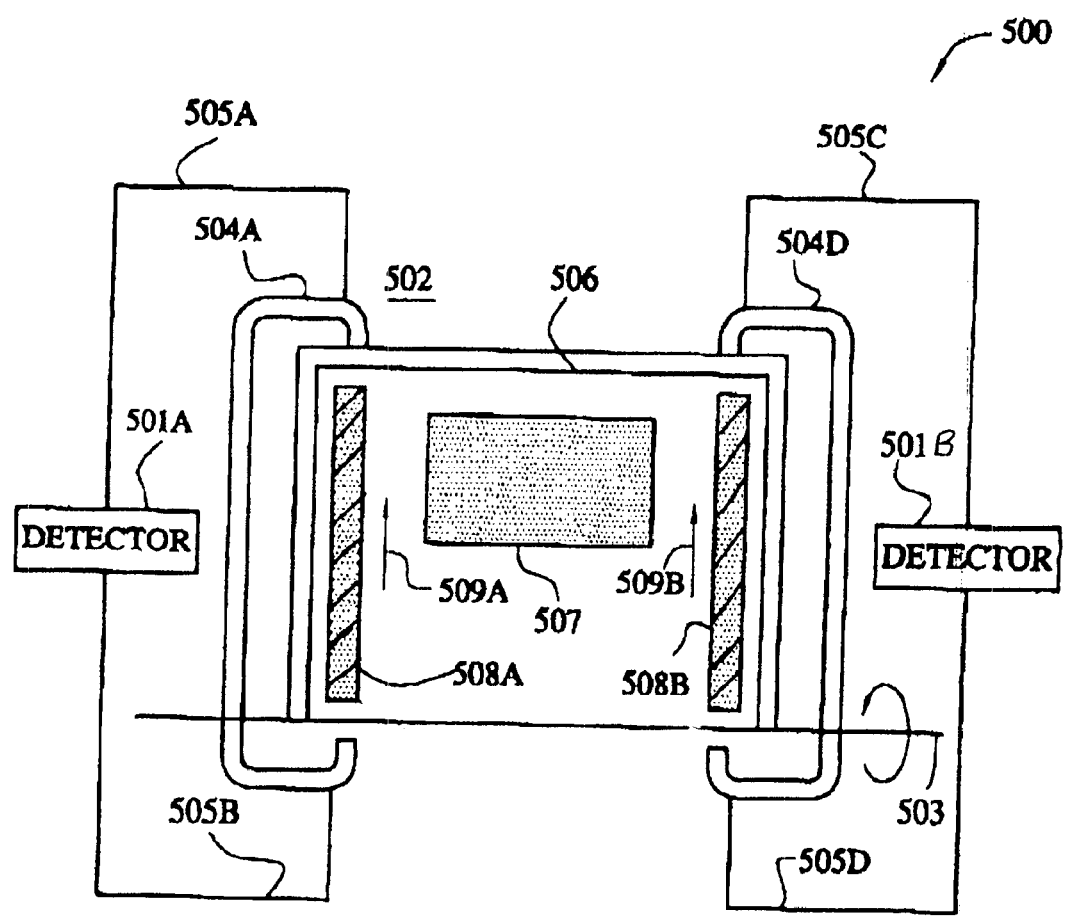
FIG. 5A is a plan view schematic diagram of an apparatus according to another alternative version of the second embodiment of the invention.

FIG. 5A depicts a plan view of an apparatus 500 according to another alternative versions of the second embodiment of the invention. The apparatus 500 generally comprises a micro machined optical element having a fixed portion in the form of a substrate 502 and a moveable portion in the form of a flap 506. The flap is movable, e.g. rotatable with respect to an axis 503. The flap may include a light-deflecting element 507 One or more magnetic sensors 504A, 504B are disposed on the substrate 502 proximate the flap 506. One or more magnetic structures 508A, 508B are disposed on the flap 506 near the sides thereof proximate the sensors 504A, 504B. The sensors 504A, 504B may be connected to detectors 501A, 501B through leads 505A, 505B, 505C, 505D. In the embodiment shown in FIG. 5A the sensors 504A, 504B and the magnetic structures 508A, 508B are oriented substantially parallel to each other and substantially perpendicular to the rotation axis 503.

The magnetic structures 508A. 508B may be magnetically active materials having, e.g. a fixed magnetic moment, i.e., they may be permanent magnets. Magnetically active materials may include Nickel, Nickel-Iron, Iron-Cobalt, Aluminum-Nickel-Cobalt, Neodymium-Iron-Boron, etc., and, may be deposited in a uniform or stepped pattern. The magnetic structures 508A, 508B may alternatively include one or more coils that carry electric current to provide a magnetic moment. Each magnetic structure 508A, 508B may be characterized by a magnetic moment having a direction indicated by the arrows 509A, 509B. In the embodiment depicted in FIG. 5B the magnetic moments of the magnetic structures 508A, 508B are oriented substantially perpendicular to the axis 503. As the flap 506 rotates about the axis 503 the change in the relative position and/or orientation of the magnetic field produced by the magnetic structures 508A, 508B with respect to the sensors 504A, 504B causes a change in the magnetic flux passing through the sensors 504A, 504B. The change in flux causes a change in an electrical property of one or more of the sensors 504A, 504B.

In a preferred embodiment, the sensors 504A, 504B may have a C-shape that includes a gap. The sensors 504A, 505B "wrap around" the magnetic elements 508A, 508B. As the position of the flap 506 changes with respect to the substrate 502 the amount of magnetic flux produced by the magnetic structures 508A, 508B that is intercepted by the sensors 504A, 504B changes. Where the sensors 504A, 504B are magnetoresistive sensors, the change in intercepted flux produces a change in one or more sense signals detected at the detectors 501A, 501B. In the particular version of the second embodiment shown in FIG. 5A, the magnetic flux is a maximum when the flap 506 is substantially parallel to the substrate 502. In this configuration, the magnetic structures 508A, 508B are disposed within the gaps in the sensors 504A, 504B.

Figure 5B:
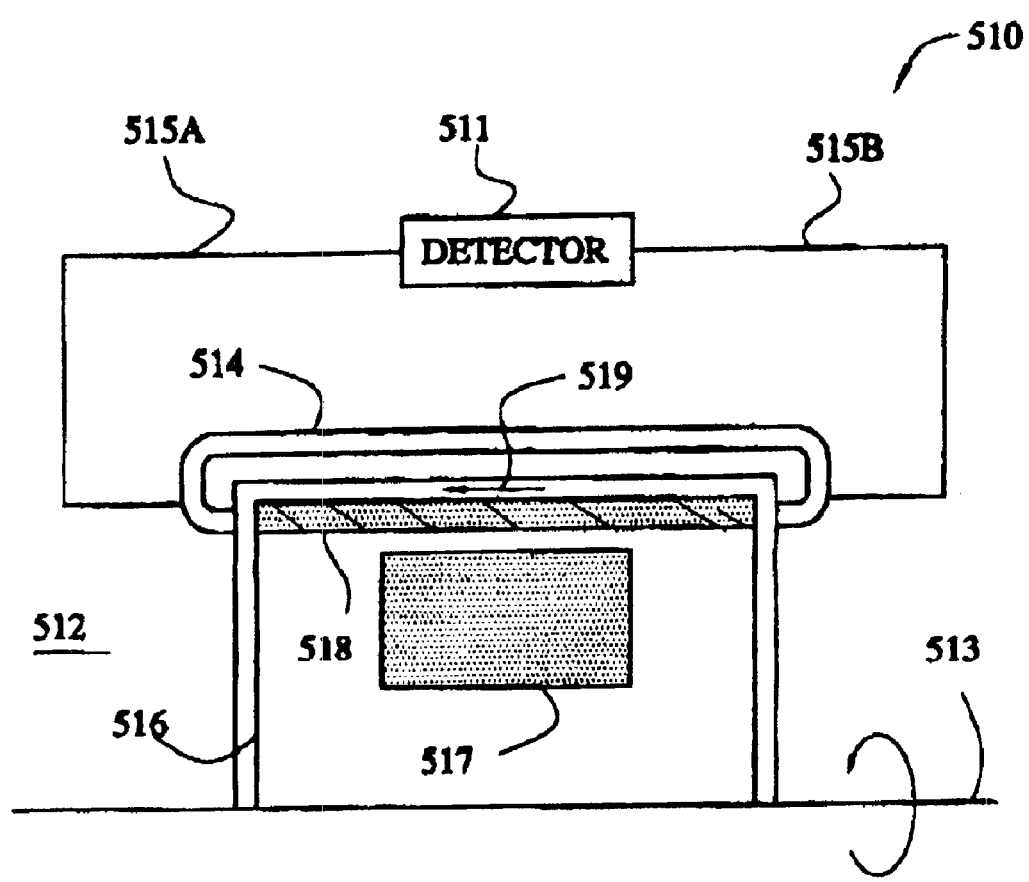
FIG. 5B is a plan view schematic diagram of an apparatus according to another alternative version of the second embodiment of the invention.

FIG. 5B depicts a plan view of an apparatus 510 according to another alternative version of the second embodiment of the invention. The apparatus 510 is a variation on the apparatus 500 of FIG. 5A. The apparatus 500 generally comprises a micro machined optical element having a fixed portion in the form of a substrate 512 and a moveable portion in the form of a flap 516. A light-deflecting element 517 may be disposed on the flap 516. The flap 516 is movable, e.g. rotatable with respect to an axis 513. A magnetic sensor 514 may be disposed on the substrate 512 proximate an end of the flap 516. A magnetic structure 518 may be disposed on the flap 516 proximate the sensor 514. The magnetic moment of the magnetic structure 518 may be oriented substantially parallel to the axis 513, as indicated by the arrow 519. As in FIG. 5A the magnetic sensor 514 may be in the form of a magnetoresistive element having a C-shape with a gap. In the particular version of the second embodiment shown in FIG. 5A the magnetic element lies within the gap when the gap when the flap 516 is substantially parallel to the substrate 512. The magnetic sensor 514 may be coupled to a detector 511, e.g., by leads 515A, 515B.

Figure 5C:
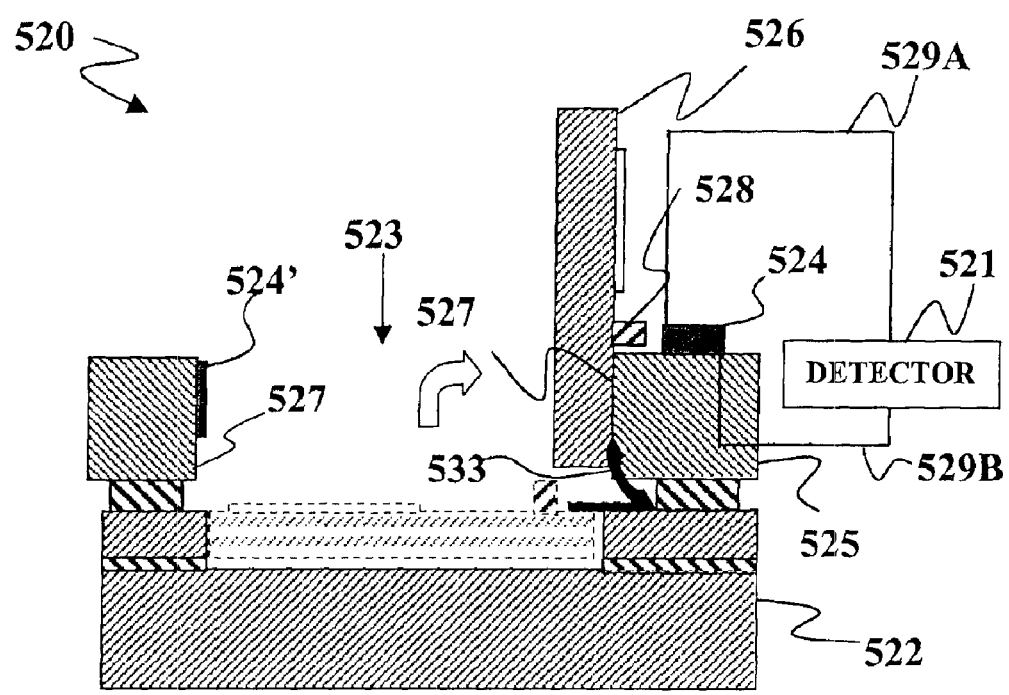
FIG. 5C is a cross-sectional schematic diagram of an apparatus according to another alternative version of the second embodiment of the invention.

Some micro machined optical elements may use a top chip design to provide a sidewall for orienting the flap in an up or "on" position. FIG. 5C depicts a cross-sectional view of an apparatus 520 according to another alternative versions of the second embodiment of the invention. The apparatus 520 may be assimilated as a variation on those described with respect to FIGS. 5A–5B. The apparatus 520 may generally comprises a micro machined optical element having fixed portions in the form of a base 522 and a top chip 525. The micro machined optical element has a moveable portion in the form of a flap 526.

In some applications such a two-chip approach is used to align the optical element in an "up" or "on" position with the flap 526 oriented substantially perpendicular to a plane of the base 522. The flap 526 may be formed from one or more layers of the substrate 522. In an "off" or down-position (shown in phantom), the flap 526 is substantially parallel to the base 522. The flap 526 may be attached for movement with respect to the substrate 522 by one or more flexures 533. By way of example, the base 522 may be a silicon-on-insulator (SOI) substrate. The top-chip 525 has an opening 523 with perpendicular sidewalls 527. The term "sidewall" as used herein refers generally to any surface that provides a reference stopping plane for the flap 526. Although a sidewall 527 that is part of the substrate is shown in FIG. 5C the sidewall may alternatively be part of the substrate 522 or part of a separate structure formed on of the substrate 522 or on the top chip 525.

The top chip 525 is aligned with the substrate 522 such that flap aligns with the opening 523 and the substrate 522 and top-chip 525 are bonded together. The opening 523 receives the flap 526 when the flap is in an "on" state, i.e., substantially perpendicular to a plane of the substrate 522. The flap 526 may be clamped against a sidewall 527 of the top chip 525 when the flap is in the "on" state as shown in FIG. 5C. When the top-chip 525 is properly aligned and bonded to the susbtrate 522 the sidewalls 527 of the openings 523 can serve as reference stopping planes to fix the up-position of the flap. In addition, the sidewalls 527 may also serve as electrodes to hold the mirrors in the up-position by electrostatic attraction. A "top chip" having openings with almost perfectly perpendicular sidewalls may be formed, e.g., by etching a <110> silicon wafer with an anisotropic etchant.

One or more magnetic sensors 524 may be disposed on the top chip 525 proximate the flap 526. Although FIG. 5C shows the sensor 524 disposed on a surface of the top chip 525, a sensor 524' may alternatively be disposed on the sidewall 527. The sensors 524, 524' may be coupled to a detector 521, e.g., via leads 529A, 529B. A magnetic structure 528, such as a magnetic material, may be disposed on the flap 526 to provide a sense magnetic field that is detected by the sensors 524, 524'. Alternatively one or more of the sensors 524, 524' may be disposed on the flap 526 and the magnetic material may be disposed on the substrate 522, the top chip 525 or the sidewalls 527. It need be stated that the top chip associated with each micro machined optical element may also be comprised of two high-aspect-ratio deep vertical walls separated by an air gap.

Figure 5D:
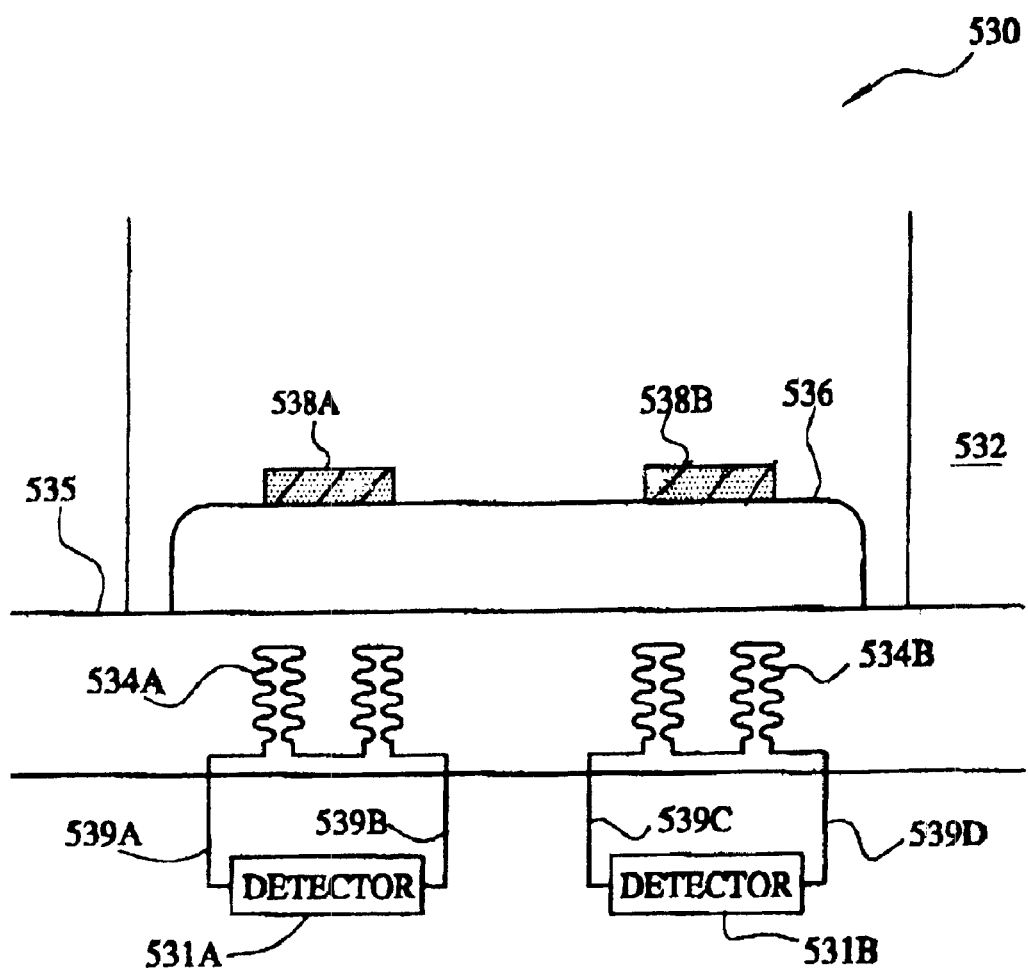
FIG. 5D is a plan view schematic diagram of an apparatus according to another alternative version of the second embodiment of the invention.
Figure 5E:
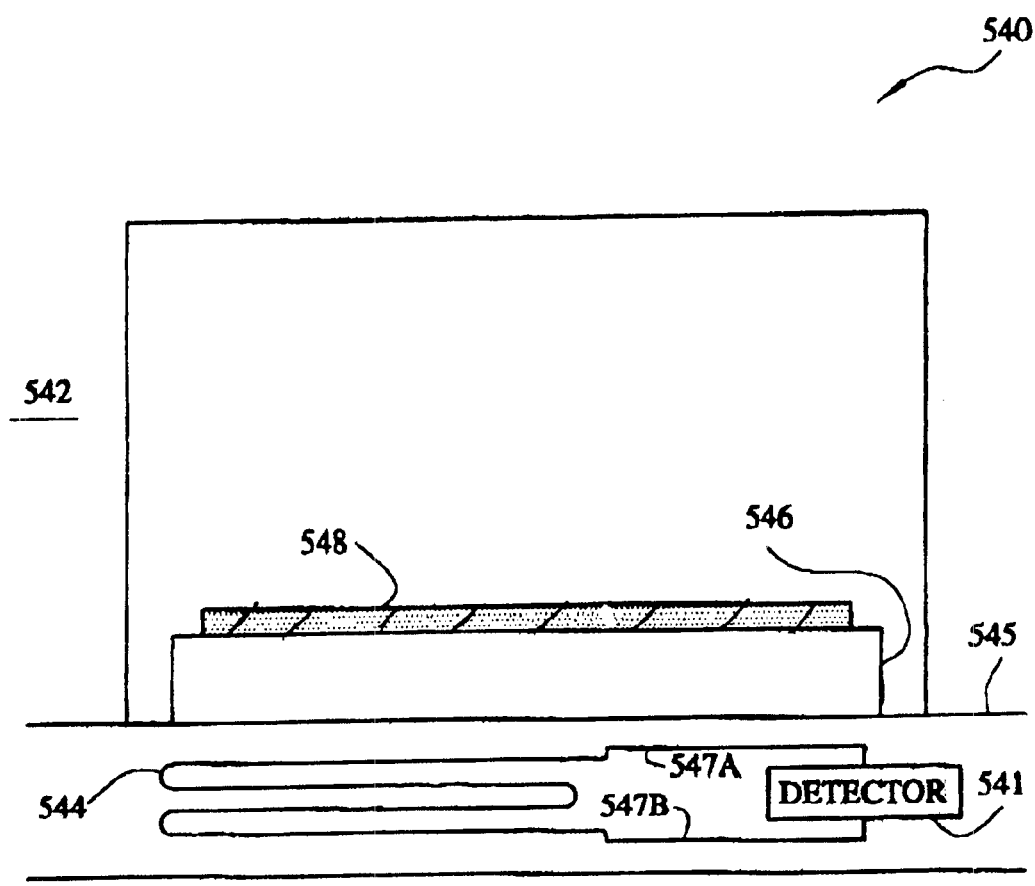
FIG. 5E is a plan view schematic diagram of an apparatus according to another alternative version of the second embodiment of the invention.

Several orientations of the sensors and magnetic elements are possible. Two particular configurations are depicted in FIG. 5D and FIG. 5E. FIG. 5D depicts a plan view of an apparatus 530 according to another alternative versions of the second embodiment of the invention. The apparatus 530 generally comprises a micro machined optical element having fixed portions in the form of a substrate 532 and a top chip 535. The micro machined optical element includes a moveable portion in the form of a flap 536. One or more magnetic sensors 534A, 534B are disposed on the top chip 535 proximate the flap 536. The sensors 534A, 534B may be coupled to a detector 531, e.g., via leads 539A, 539B. The sensors 534A, 534B may be in the form of serpentine coils of magnetic material. The serpentine shape allows a greater length for the sensors, which increases their sensitivity to changes in magnetic flux. One or more magnetic elements 538A, 538B are disposed on the flap 536 near the sides thereof. The magnetic elements 538A, 538B may be positioned such that they are proximate the sensors is 534A, 534B when the flap 536 is clamped against the top chip 535. In this position, the magnetic flux though the sensors 534A, 534B from the magnetic structures 538A, 538B may be maximized.

FIG. 5E depicts a plan view of an apparatus 540 according to another alternative version of the second embodiment of the invention. The apparatus 540 generally comprises a micro machined optical element having fixed portions in the form of a substrate 542 and top chip 545. The micro machined optical element may include a moveable portion in the form of a flap 546. A magnetic sensor 544 may be disposed on the top chip 545 proximate the flap 546. The magnetic sensor 544 may be coupled to a detector 541, e.g. through leads 547A, 547B. The magnetic sensor 544 may be in the form of a serpentine pattern of magnetoresistive material having features in common with the serpentine patter described with respect to FIG. 5D. One or more magnetic elements 548 may be disposed on the flap 516 proximate an end thereof. The magnetic structure 548 may be positioned on the flap 546 such that it is proximate the magnetic sensor 544 when the flap is in an "on" position.

Other variations are possible on the above embodiments. For example, the magnetic sensor element may include an inductive coil disposed on either a fixed or moveable portion of a micro machined optical element. Changes in the position of the moveable portion may lead to changes in an inductance of the coil. The change in inductance may be correlated to the change in position. Changes in inductance may be less susceptible to noise than changes in capacitance.

Figure 6:
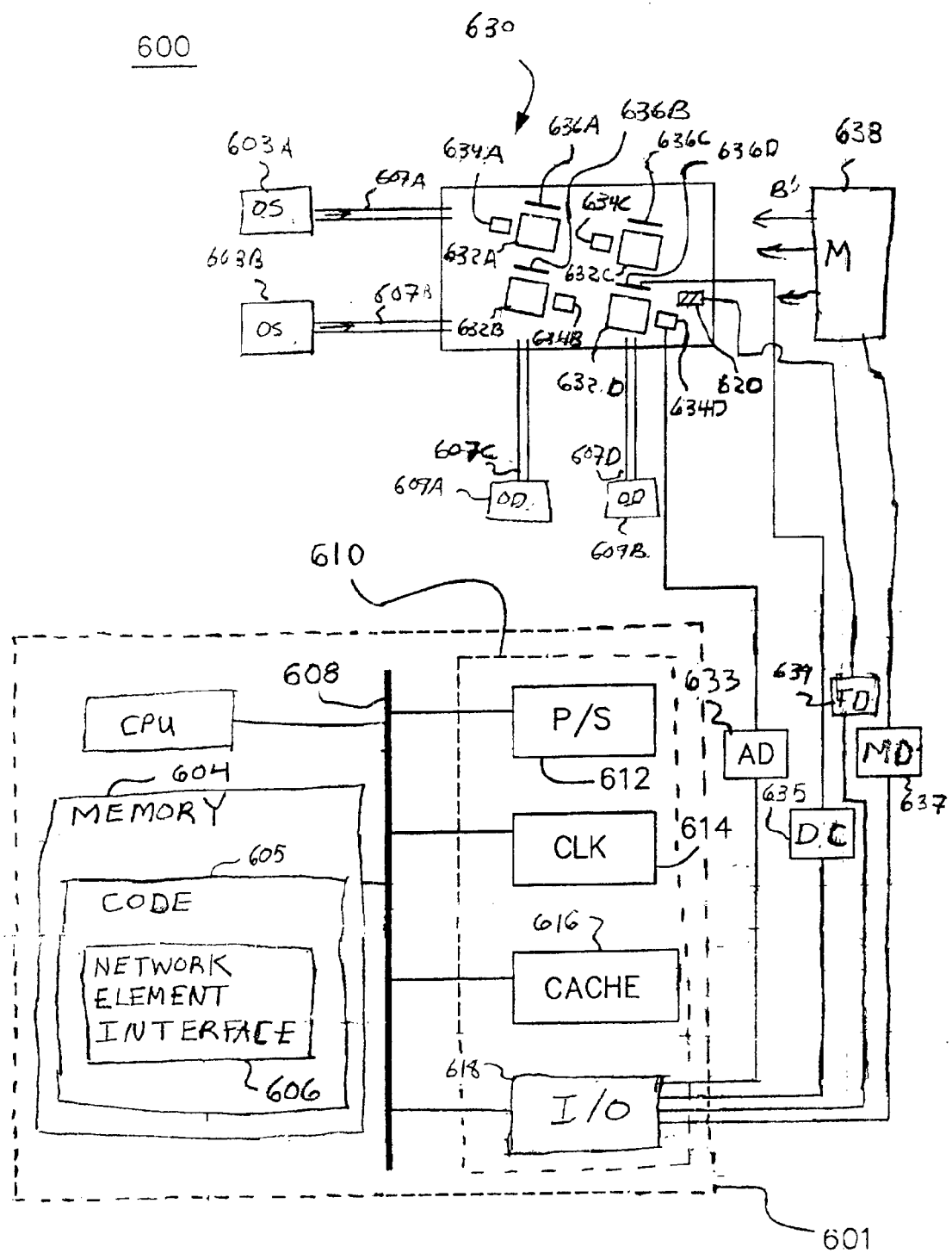
FIG. 6 depicts an example schematic diagram of an optical switching system according to a fourth embodiment of the present invention.

FIG. 6 depicts a block diagram depicting an optical communications system 600 according to a fourth embodiment of the invention. In the system 600, a method having features in common with the method 100 of FIG. 1 may be implemented as a computer program code 605 running on a processor of a computer controlled apparatus having features in common with the MEMS optical switch 400 described above with respect to FIG. 4. In the embodiment shown, the program code 605 controls the operation of one or more MEMS optical elements 632A, 632B, 632C, 632D in an optical switch 630. Although the program 605 is described herein with respect to a MEMS optical switch, those skilled in the art will recognize that programs embodying the method of the present invention may be applied to any MEMS device. The optical elements 632A, 632B, 632C, 632D may have features in common with the optical elements described above. The optical switch 630 may have features in common with the type of switch 400 shown in FIG. 4. By way of example, the switch 630 may be a 2D MEMS optical switch. Each optical element 632A, 632B, 632C, 632D may include a moveable portion that is moveably coupled to a substrate and actuated by, for example, electrostatic, pneumatic thermal, acoustic or magnetic actuators 634A, 634B, 634C, 634D. The optical elements 632A, 632B, 632C, 632D may be clamped in vertical or horizontal position by voltages applied to clamping electrodes (not shown).

One or more magnetic sensors 636A, 636B, 636C, 636D may be respectively coupled to moveable and/or fixed portions of the optical elements 632A, 632B, 632C, 632D. The magnetic sensors 636A, 636B, 636C, 636D may be of any of the types described above. The magnetic sensors 636A, 636B, 636C, 636D sense changes in the position or state of the optical elements 632A, 632B, 632C, 632D with respect to a magnetic field B' provided, e.g., by a magnet 638. If the actuators 634A, 634B, 634C, 634D are magnetic actuators, the magnetic field B' may be the same magnetic field that drives the actuators. Alternatively, the magnetic field B' may be a separate sense magnetic field. In some embodiments, a single magnet 638 may be used to actuate all the optical elements 632A, 632B, 632C, 632D. In such a situation, the actuators 634A, 634B, 634C, 634D may include electrodes for clamping moveable portions of the optical elements 632A, 632B, 632C, 632D in their respective "ON" or "OFF" states. The switch 630 may optionally include a temperature sensor 620 disposed in proximity to switch 630 or positioned in thermal contact with a portion of the switch, e.g. one or more of the optical elements 632A, 632B, 632C, 632D. The temperature sensor may produce a signal that is proportional to a temperature of the switch 630. By way of example, the temperature sensor 620 may be a thermocouple, thermistor, infrared (IR) temperature sensor, etc.

One or more input fibers 607A, 607B and output fibers 607C, 607D may be optically coupled to the optical switch 630. Optical sources (OS) 603A, 603B may provide optical signals to the input fibers 607A, 607B while optical detectors (OD) 609A, 609D may be optically coupled to the output fibers 607C, 607D to establish, for example, that the micro machined optical elements in the switch are in a known state. Alternatively, the optical sources and detectors may be replaced with optical transceivers to allow two-way signal traffic through the switch 630.

A switching sub-system 600 may typically include a switch 630 combined with a controller 601. The controller 601 may be a self contained microcontroller such as the PICK Microchip, or controller 601 may be configured to include a CPU 602, memory 604 (e.g., RAM, DRAM, ROM, and the like), clock 614 and well-known support circuits 610 such as power supplies 612, input/output (I/O) functions 618 coupled to a control system bus 608. The memory 604 may contain instructions that the processor unit 602 executes to facilitate the performance of the apparatus 600. The instructions in the memory 604 may be in the form of the program code 605. The code 605 may conform to any one of a number of different programming languages such as Assembly, C++, JAVA or a number of other languages. The controller 601 typically operates the apparatus 600 through I/O functions 618 in response to data and program code instructions stored and retrieved by the memory 604.

The CPU 602 may be coupled to the elements of the system 600 via the system bus 608 and the I/O functions 618. The elements of system 600 may include the following: one or more detector circuits (DC) 635 coupled to one or more of the magnetic sensors 636A, 636B, 636C, 636D, and one or more actuator drivers (AD) 633 coupled to one or more of the actuators 634A, 634B, 634C, 634D. If the magnet 638 is an electromagnet, a magnet driver (MD) 637 may be coupled to the magnet. For the sake of clarity, connection is shown to only one of the magnetic sensors 636D and one of the actuators 634D. In practice, all the magnetic sensors 636A, 636B, 636C, 636D and actuators 634A, 634B, 634C, 634D may be coupled to the I/O functions 618. One or more clamping voltage sources may be optionally coupled between clamping electrodes in the switch 601 and the I/O functions 618. The optical sources 603A, 603B and the optical detectors 609A, 609B may also be coupled to the I/O functions 618 and system controller 601 may provide control to switch optical signals between the input fibers 607A, 607B and the output fibers 607C, 607D. The support circuits 610 may also include a temperature detector (TD) 639 coupled to the temperature sensor 620 and the I/O functions 618.

It should be stated that depending on the configuration or selection of controller 601 and system 600, the conditioning circuits, including actuator driver 633, temperature detector 639, magnetic driver 637 and/or detector circuit 635 may be implemented in software form, e.g., within code 605, such that I/O functions 618 may directly connect to each respective switch component.

The system 600 may be a subsystem or component of a network element (not shown). The network element may be part of a network (not shown). The microcontroller 601 may include network element interface 606 which may be implemented in software e.g. in a subroutine in memory 604 or hardware to allow the system 600 to communicate with the network element. Such communication may include, but is not limited to, switching commands issued from the network element to the system 600 and switch state data from the system 600 to the network element.

Certain steps of the method described above with respect to FIG. 1 may be implemented by a suitable computer program code 605 running on the CPU 602 of the controller 601. The CPU 602 may form a general-purpose computer that becomes a specific purpose computer when executing programs such as the program 605. Although the invention is described herein as being implemented in software and executed upon a general purpose computer, those skilled in the art will realize that the invention could be implemented using hardware such as an application specific integrated circuit (ASIC), microcontroller or other hardware circuitry. As such, it should be understood that the invention can be implemented, in whole or in part, in software, hardware or both.

A computer program 605 may be devised to implement steps 104 and 106 described above with respect to FIG. 1. The program 605 is suitable for monitoring and controlling the position or state of the optical elements 603A, 603B, 603C, 603D of the optical switch 601 in accordance with embodiments of the present invention. By way of example, the program 605 may implement fault detection in the system 600. For example, suppose that only when the optical element 632B is in an "ON" state, optical element 632B deflects optical signals from input fiber 607B to output fiber 607C. The state of optical element 632B may be determined by sending an optical signal towards optical element 632B from the source 603B to input fiber 607B and monitoring the optical signal at output fiber 607C with optical detector 609A. If the optical signal from the optical source 603B is detected by the optical detector 609A optical element 632B is presumably in the "ON" state. While the optical element 632B is known to be in the "ON" state, the property of the magnetic sensor associated with thereto may be recorded through I/O function 618 and stored in a look-up table in memory 604. This step may occur when the magnet 604 is turned on to provide a sense field for the magnetic sensors 636A, 636B, 636C, 636D or when the magnet 638 is turned on to perform a switching event. Alternatively, a signal from the magnetic sensor 636B disposed proximate the optical element 632B may be measured when the movable element associated with the magnetic sensor 636B is in a known state. . Signals from sensors 636 may be measured in batch or selectively addressed in response to code 605 and through I/O functions 618 when they are in a known state.

The position of optical element 632B changes when it moves from the "ON" state to the "OFF" state. Consequently, the magnetic sensor 636B may produce a different signal when the optical element 632B is in the OFF state. The other magnetic sensors 636A, 636C, 636D may also produce different signals. In a manner similar to that described above, a set of signals from the sensors 636A, 636B, 636C, 636D may be correlated to the "OFF" state of the optical element 632B. In a similar fashion, the known "ON" and "OFF" states of the other optical elements 632A, 632C, 632D may be correlated to measured signals from the magnetic sensors 636A, 636B, 636C, 636D.

These signals from the magnetic sensors 636A, 636B, 636C, 636D may be organized by the program 605 as a set of predetermined signals, e.g. in a look-up table stored in memory 604. The program 605 may index the aforementioned look-up table after reading the value or values associated with the magnetic sensor property to determine that the state of the switch is configured according to the requests of network element interface 606.

The properties of the magnetic sensors 636A, 636B, 636C, 636D may be temperature dependent. Consequently, signals from the magnetic sensors 636A, 636B, 636C, 636D may drift as the temperature of the switch 630 changes. To compensate for such drift, the program 605 may include instructions for temperature compensation. By way of example, such instructions may include measuring the signal from the magnetic sensors 636A, 636B, 636C, 636D for the "ON" and off states of the optical elements 632A, 632B, 632C, 632D at different temperatures measured by the temperature sensor 620. The program may then determine ranges for the values of the magnetic sensor signals that correspond to the "ON" and "OFF" states. If, over a certain temperature range, the two ranges do not overlap the state of an optical element may be determined by measuring that magnetic sensor signal to see whether it falls in the "ON" range or the "OFF" range.

It must be stated that the look-up table storing the predetermined magnetic sensor property values associated with each micro machined movable element, may be configured to allow a test value to fall within a range of predetermined values for added stability. For example, the magnetic sensor property values read into memory 604 through I/O functions 618, when the optical element is in a known state to achieve the predetermined value for the lookup table, may be configured in code 605 such that test values read into memory 604 through I/O functions 618 when the optical element is not in a known state may be substantially equal to the lookup values in the table. This approach results in added stability and may be used to compensate for temperature variation effects.

If there is substantial overlap between the "ON" and "OFF" ranges it may be desirable to correct for thermal drift in real time. The program 605 may correct for thermal drift by relating the measured magnetic sensor signals in the "ON" and "OFF" states to temperature measurements made during operation of the switch 630. The relationship may be stored in the form of a look-up table. Alternatively, the relationship may be in the form of a temperature correction equation. For example, in the case of a linear relationship between temperature and magnetic sensor signal, the program may calculate a temperature drift coefficient. The temperature drift coefficient may be used to adjust the predetermined magnetic sensor signals for changes in temperature.

Alternatively, the system controller 601 may be coupled to a temperature regulator (not shown) coupled, e.g. through the I/O circuits 618. The program 605 may instruct the temperature regulator to maintain the temperature of the switch 630 within a desired temperature range in response to temperature measurements from the temperature sensor 620. Preferably, the desired temperature range is sufficiently narrow that any thermal drift of magnetic sensor signal may be neglected. Furthermore, the system 600 may employ some combination of thermal drift correction and temperature regulation to compensate for changes in temperature.

It should also be stated that magnetic sensors may be connected together e.g. through a bridge circuit and the output of the connected sensors may be batch read by the controller 601 to determine the individual state of each movable portion in the batch of elements. This can be accomplished by designing or tuning the sensors to produce a unique value in each known ON and OFF state. For example, a magnetoresistive element associated with each micro machined optical element may be designed to produce a unique prime resistance value when turned ON or OFF. Magnetic sensors may be connected in series or parallel and grouped according to, but not limited, rows or columns. As so, the program code 605 may engage in a row or column select to pull the combined sensor property value into memory for post processing by the CPU. Program code 605 may then perform data processing on the recorded property value to discern the individual state of all member optical flaps contained in group of sensors. Memory 604 may store the predetermined prime values associated with the plurality of sensors and the program 605 may engage in an process whereby the recorded value of the combined sensor group is compared against various prime number combinations associated with the group, until a match is found. When a match is determined, the micro-machine optical elements associated with the match prime numbers set will share the same ON or OFF state, and the individual states of the batch group can be determined. While the above is a complete description of several embodiments of the present invention, it is possible to use various alternatives, modifications and equivalents. For example, the magnetic switch state tracking method described above with respect to FIG. 6 may be readily applied to tracking the state of a 3D steered beam optical switch having optical elements that may move through a continuous range of positions. Therefore, the scope of the present invention should be determined not with reference to the above description but should, instead, be determined with reference to the appended claims, along with their full scope of equivalents.

What is claimed is:

1. An apparatus comprising:
   a micro machined optical element; and
   a magnetic sensor disposed on the micro machined optical element,
   wherein the micro machined optical element includes a moveable portion and at least one magnetic sensor disposed on the moveable portion,
   wherein the micro machined optical element includes a fixed portion and at least one sensor further includes one or more magnetic sensors disposed on the fixed portion, wherein the fixed portion includes a base and the magnetic sensor that is disposed on the fixed portion is disposed on the base.

2. An apparatus, comprising:

a micro machined optical element; and a magnetic sensor disposed on the micro machined optical element, wherein the micro machined optical element includes a moveable portion and at least one magnetic sensor disposed on the moveable portion, wherein the micro machined optical element includes a fixed portion and at least one sensor further includes one or more magnetic sensors disposed on the fixed portion wherein the fixed portion includes a top chip and the sensor is disposed on the top chip.

3. An apparatus, comprising:

a micro machined optical element; and a magnetic sensor disposed on the micro machined optical element, wherein the micro machined optical element includes a moveable portion and at least one magnetic sensor disposed on the moveable portion, wherein the micro machined optical element includes a fixed portion and at least one sensor further includes one or more magnetic sensors disposed on the fixed portion wherein the sensor that is disposed on the movable portion and the sensor that is disposed on the fixed portion are electrically coupled in a bridge circuit.

4. The apparatus of claim 3 wherein the bridge circuit is a Wheatstone bridge circuit.

5. An apparatus, comprising:

a micro machined optical element, wherein the micro machined optical element includes a moveable portion wherein the moveable portion is moveable with respect to an axis;

at least one magnetic sensor disposed on the micro machined optical element, wherein the magnetic sensor senses a sense magnetic field that is separate from a magnetic field that actuates the micro machined optical element, and a magnetic structure disposed on the micro machined optical element, wherein the magnetic structure creates the sense magnetic field or changes the magnitude or direction of the sense magnetic field, wherein the magnetic structure is disposed substantially parallel to the axis, wherein the at least one magnetic sensor includes a magnetoresistive sensor;

wherein the magnetoresistive sensor has a "C" shape having a gap;

wherein, in at least one position of the moveable element, the magnetic structure is disposed within the gap.

6. An apparatus, comprising:

a micro machined optical element, wherein the micro machined optical element includes a moveable portion wherein the moveable portion is moveable with respect to an axis, wherein the micro machined optical element includes a moveable portion wherein the moveable portion is moveable with respect to an axis;

a magnetic sensor disposed on the micro machined optical element, wherein the magnetic sensor senses a sense magnetic field that is separate from a magnetic field that actuates the micro machined optical element, wherein the magnetic material is disposed substantially perpendicular to the axis, wherein the at least one magnetic sensor includes a magnetoresistive sensor; wherein the magnetoresistive sensor has a "C" shape having a gap.

7. The apparatus of claim 6 wherein, in at least one position of the moveable element, the magnetic material is disposed within the gap.

8. An apparatus, comprising:

a micro machined optical element;

a magnetic sensor disposed on the micro machined optical element, wherein the magnetic sensor senses a sense magnetic field that is separate from a magnetic field that actuates the micro machined optical element; and a magnetic structure disposed on the micro machined optical element, wherein the magnetic structure creates the sense magnetic field or changes the magnitude or direction of the sense magnetic field;

wherein the magnetic sensor includes a magnetoresistive sensor characterized by a serpentine shape.

* * * * *